United States Patent

Stacy et al.

[11] Patent Number: 5,179,178
[45] Date of Patent: Jan. 12, 1993

[54] OLEFIN POLYMERIZATION

[75] Inventors: Elizabeth M. Stacy; M. Bruce Welch; Shirley J. Martin; Max P. McDaniel; Dale E. Pierce, all of Bartlesville, Okla.

[73] Assignee: Phillips Petroleum Company, Bartlesville, Okla.

[21] Appl. No.: 883,602

[22] Filed: May 15, 1992

[51] Int. Cl.$^5$ ................................................ C08F 2/00
[52] U.S. Cl. ..................................... 526/64; 526/107; 526/125; 526/129; 526/135; 526/156; 526/352; 502/103; 502/108; 502/117
[58] Field of Search .................. 526/64, 107, 125, 129, 526/135, 156

[56] References Cited

U.S. PATENT DOCUMENTS

| | | | |
|---|---|---|---|
| 3,152,872 | 10/1964 | Scoggin et al. | 34/15 |
| 4,138,387 | 2/1979 | Bluestein | 260/42.26 |
| 4,325,837 | 4/1987 | Capshew et al. | 526/125 |
| 4,424,341 | 1/1984 | Hanson et al. | 528/501 |
| 4,451,633 | 5/1984 | Brownscombe et al. | 526/348.6 |
| 4,667,084 | 5/1987 | Regge | 219/301 |
| 5,007,997 | 4/1991 | Zones et al. | 208/46 |
| 5,034,361 | 7/1991 | Job et al. | 502/9 |

OTHER PUBLICATIONS

Kirk-Othmer Encyclopedia of Chemical Technology, vol. 20, Third Edition, pp. 766-776.

Primary Examiner—Joseph L. Schofer
Assistant Examiner—David Wu
Attorney, Agent, or Firm—Edward L. Bowman

[57] ABSTRACT

A process for polymerizing olefins wherin a suitable amount of a fumed refractory oxide is used to improve the flow of particulate catalyst as a slurry of that catalyst is charged to the polymerization zone.

22 Claims, No Drawings

OLEFIN POLYMERIZATION

FIELD OF THE INVENTION

The present invention relates to the polymerization of olefins. In one aspect, the present invention relates to slurry or particle form polymerization. In another aspect, the present invention relates to olefin polymerization using a continuous loop-type reactor. And still another aspect, the present invention relates to a novel method for charging prepolymerized polymerization catalyst to the polymerization zone.

BACKGROUND OF THE INVENTION

A number of the later generation high activity olefin polymerization catalysts are prepared by processes which result in extremely fine catalyst particles. The use of such fine catalyst particles in actual commercial polymerization has often led to various problems including the production of undesirable levels of fine polymer and undesired difficulties in handling the catalyst.

One approach that has been taken with many fine high activity olefin polymerization and catalysts has been the application of prepolymer to increase the size and/or integrity of the catalyst particles which are ultimately charged to the polymerization zone.

The use of prepolymer on the catalyst introduces its own separate problems. For example, it has been noted that the presence of the prepolymer can result in plugged feeding lines and feeding difficulties in mud pots which arise from the tendency of such prepolymerized catalysts to bridge in the restrictive openings of either mud pots or feed lines. These problems become particularly evident as the level of prepolymer on the catalyst is increased. The feeding of catalyst slurries can even be a problem for particulate olefin polymerization catalysts that have not been subjected to prepolymerization, for example particulate chromium-containing catalysts.

In the prior art, there have been disclosures of using various particulate diluents such as silica gel or inert polymer in combination with the particulate catalyst. The use of particulate diluents has been found to introduce additional unique problems. For example, and most often, the particulate diluents result in undesired dilutions of the ultimate polymer properties.

An object of the present invention is to provide an improved method for charging a slurry of particulate olefin polymerization catalyst to the reaction zone.

Another object of the present invention is to provide a process for polymerizing olefins with a particulate olefin polymerization catalyst and a particulate diluent which has a less adverse effect upon the properties of the ultimate polymer than diluents heretofore used.

Another object of the present invention is to provide a process for polymerizing olefins which allows one to use olefin polymerization catalysts containing much higher levels of prepolymer than have generally been used in the past.

Other aspects, objects, and advantages of the present invention will be apparent to those skilled in the art having the benefit of the following disclosure.

SUMMARY OF THE INVENTION

In accordance with the present invention there is provided a process for polymerizing olefins comprising charging a liquid slurry of particulate olefin polymerization catalyst through a restrictive opening into a polymerization zone wherein said catalyst is contacted with at least one olefin under suitable polymerization conditions, wherein said slurry of prepolymerized olefin polymerization catalyst has been prepared by combining a refractory oxide powder with a suitable liquid and said particulate catalyst, said refractory oxide powder being selected from the group consisting of fumed silica, fumed titanium dioxide, and fumed alumina and being added to the slurry in an amount sufficient to improve the flow of the catalyst through the restrictive opening.

DETAILED DESCRIPTION OF THE INVENTION

It is considered that this invention would be applicable to any olefin polymerizations which involve charging a liquid slurry of particulate olefin polymerization catalyst into a polymerization zone. Examples of particulate olefin polymerization catalysts include chromium as well as other transition metal-containing particulate catalysts. Some examples of chromium catalysts are disclosed in U.S. Pat. Nos. 3,225,023; 3,900,457; 3,887,494; and 4,405,501, the disclosures of which are incorporated herein by reference.

The term liquid slurry as used herein is used broadly to refer to any mixture of a solid and a liquid. Thus, the term slurry is intended to cover the wetted settled solid often referred to as "mud" that results when a catalyst settles after being mixed in a liquid.

The present invention is considered to be particularly applicable for processes employing olefin polymerization catalysts of the type disclosed in U.S. Pat. No. 4,325,837, the disclosure of which is incorporated herein by reference. An especially preferred type of olefin polymerization catalyst is prepared by contacting magnesium dichloride and a titanium alkoxide in a liquid to obtain a solution, then contacting the solution with an alkylaluminum halide to obtain a solid, then contacting the solid with an olefin to obtain a prepolymerized solid and then contacting the resulting prepolymerized solid with titanium tetrachloride. In a particularly preferred embodiment the titanium alkoxide is a titanium tetrahydrocarbyl oxide of the formula Ti(OR)$_4$ wherein each R is individually selected from an alkyl group containing from about 1 to about 10 carbon atoms, more preferably about 1 to about 4 carbon atoms. It is also currently preferred to employ as the precipitating agent an alkylaluminum halide of the formula R$_m$AlZ$_{3-m}$ wherein R is a alkyl group having 1 to 8 carbon atoms, Z is a halogen, hydrogen, or hydrocarbyl group having 1 to 8 carbons and m is a number in the range of 1 to 3. The currently most preferred precipitating agents are alkylaluminum halides such as diethylaluminum chloride, ethylaluminum dichloride, and ethylaluminum sesquichloride. For some applications it has been found desirable to include small amounts of water or an electron donor such as an alcohol in the reaction between the magnesium dichloride and the titanium alkoxide.

Such prepolymerized catalyst can have the prepolymer deposited thereon by prepolymerization such as taught in the aforementioned U.S. Pat. No. 4,325,837. It is also within the scope of the present invention to have the prepolymer deposited upon the catalyst by various other means such as plasma or flame spraying of a polymer coating, or the slurrying of the catalyst with a polymer solution followed by the addition of a counter-solvent to precipitate the polymer. The currently preferred process involves prepolymerizing and then treating the resulting catalyst with titanium tetrachloride. In an especially preferred embodiment the resulting titanium tetrachloride-treated catalyst is then contacted with a organometallic reducing agent before the catalyst is introduced into the polymerization zone. Most preferably the solid is washed with a hydrocarbon after the treatment with the organometallic compound. This pretreatment of the catalyst with the reducing agent has been found to reduce the tendency of the catalyst to cause reactor fouling during polymerization. The currently preferred organometallic reducing agents are those of the formula $R_mAlZ_{3-m}$ wherein R is a hydrocarbyl group having 1 to 8 carbons, Z is a halogen, hydrogen, or hydrocarbyl group having 1 to 8 carbons, and m is a number in the range of 1 to 3. The currently most preferred reducing agents for this step are triethylaluminum and diethylaluminum chloride.

One way for forming prepolymer involves conducting the precipitation in the presence of an aliphatic mono-1-olefin. Another technique, which is currently preferred, involves contacting the precipitated solid with an aliphatic mono-1-olefin under suitable conditions to form a prepolymer. This can be done either before or after the solid is treated with titanium tetrachloride but the currently preferred process involves carrying out the prepolymerization before the titanium tetrachloride treatment. Examples of olefins which can be used for forming prepolymer include olefins such as ethylene, propylene, 1-butene, 1-pentene, 1-hexene, 1-heptene, 4-methyl-1-pentene, 1-heptene, 1-octene, and the like and mixtures of one or more thereof. The weight percent of prepolymer can vary over a wide range, typically in the range of about 1 to about 95 weight percent, more generally in the range of about 1 to about 80 weight percent, and still more preferably in the range of about 1 to about 50 weight percent.

In carrying out the present invention, the particulate catalyst is combined with a suitable amount of the refractory oxide powder. A number of suitable refractory oxide powders are known, some examples include the fumed, or pyrogenic, silicas, aluminas, and titanium dioxides. The currently preferred refractory oxide is fumed silica. Most typically the refractory oxide that is employed would have an average primary particle size in the range of about 0.001 micron to about 0.1 micron, more preferably about 0.001 micron to about 0.03 micron. The currently preferred fumed silica has an average primary particle size in the range of about 0.005 to about 0.02 microns, still more preferably about 0.005 to about 0.015 microns. As a general rule, fumed or pyrogenic refractory oxides are present in the form of aggregates of the primary particles, said aggregates generally substantially all having as their largest dimension a value of less than about 3 microns. This distinguishes these precipitated pyrogenic oxides from oxide gels such as silica gels which have much larger aggregates. The size of the primary particles and of the aggregates of the primary particles can be readily determined using an electron microscope as known in the art.

The catalyst and the refractory oxide powder are combined in a liquid. Typically any liquid that is suitable for use in the olefin polymerization can be employed. Typically, substantially dry, i.e. anydrous, organic liquids can be employed. Some typical examples include dichloromethane, hexane, heptane, isobutane, cyclohexane, and the like.

The amount of refractory oxide powder relative to the catalyst can vary over a wide range, depending upon the particular catalyst and the type of result desired. One advantage of the present invention, however, is that by using the pyrogenic type refractory oxide powder of small aggregate size, it is possible to obtain improvements in catalyst flow using much lower weight percent levels of the solid diluent than have generally been used in the past when oxide gel solid diluents such as silica gel were employed. As a general rule, the weight ratio of the fumed refractory oxide powder to the solid particulate catalyst would be in the range of about 0.01/1 to about 0.5/1, more preferably about 0.025/1 to about 0.35/1. In a particularly preferred embodiment using fumed silica having an average primary particle size in the range of about 0.005 to about 0.03 micron, it is preferred for the weight ratio of the fumed silica to the solid catalyst to be in the range of about 0.05/1 to about 0.30/1, still more preferably about 0.12/1 to about 0.25/1.

The amount of liquid diluent used in preparing the slurry of the refractory oxide powder and a catalyst can vary over a wide range. Generally, any amount of liquid can be employed which allows one to provide controlled feeding of the catalyst to the polymerization vessel. Typically, the liquid would be employed in an amount such that the slurry contained about 1 to about 50 weight percent solids, more preferably about 10 to about 25 weight percent solids.

The slurry of the catalyst and the refractory oxide powder is employed in polymerization using generally the same conditions that have been used in the past with slurries of catalyst. The invention is particularly useful for the homopolymerization or copolymerization of mono-1-olefins. Olefins having 2 to 18 carbon atoms would most often be used. The invention is considered particularly applicable to slurry or particle form polymerization processes, especially continuous polymerization processes such as disclosed in U.S. Pat. Nos. 3,152,872 and 4,424,341, the disclosures of which are incorporated herein by reference. In such continuous processes a reactor such as a loop reactor is continuously charged with suitable quantities of liquid diluent, catalyst, cocatalyst, polymerizable compounds, and hydrogen, if any, in a desired order. The reactor product is continuously withdrawn and a polymer recovered as appropriate, generally by flashing the liquid diluent and unreacted monomers and recovering the resulting polymer.

A further understanding of the present invention and its objects and advantages will be provided by the following examples.

EXAMPLE I

Several refractory oxides were evaluated as agents for improving the flow characteristics of a prepolymerized olefin catalyst slurry. The physical properties of these various refractory oxides is summarized in Table 1.

TABLE 1

Physical Properties of the Refractory Oxides

| Name | Supplier | Description | Surface Area (m2/g) | Primary Particle Size (μ) | Bulk Density (lb/ft3) | Hydrophilic |
| --- | --- | --- | --- | --- | --- | --- |
| M-5 | Cabot | Fumed silica | 200 ± 25 | .014 | 2.5 | Yes |
| M-7 | Cabot | Fumed silica | 200 ± 25 | .014 | 5.0 | Yes |
| PGT | Cabot | Fumed silica | 200 ± 20 | .011 | 2.5 | Yes |
| HS-5 | Cabot | Fumed silica | 325 ± 25 | .008 | 2.5 | Yes |
| TS-720 | Cabot | Fumed silica | 100 ± 20 | .012 | 3.5 | No |
| P25 | Degussa | Fumed TiO2 | 50 ± 15 | .030 | 9.4 | Yes |
| Aluminum Oxide C | Degussa | Fumed alumina | 100 ± 15 | .020 | 3.8 | No |
| Ketgen Grade G Alumina | Akzo | Alumina | 340 | 25* | 12.5 | Yes |

*Aggregate size rather than primary particle size.

The fumed silicas which were obtained from Cabot Corporation were either used as supplied or dried in the oven overnight. The aluminum oxide and titanium dioxide were obtained from Degussa. The samples were shaken to mix the additive and the catalyst thoroughly and then allowed to settle. The initial evaluations were done by tipping flasks containing the resulting mixture and comparing the angle of repose of the solids. The fumed refractory oxides were all found to provide improvements in catalyst flow. In contrast, the larger particle size Grade G alumina flowed poorly. At levels similar to those used for HS-5, i.e. 5 g alumina/20 g catalyst, no flow improvement was demonstrated. At larger amounts, i.e. 50 g alumina/20 g catalyst only a very slight improvement, if any, was noted.

EXAMPLE II

The effect of these various refractory oxide powders on polymerization was then evaluated using various titanium-containing prepolymerization catalysts, all of which were catalysts prepared using techniques involving contacting a titanium tetraalkoxide with magnesium dichloride to form a solution, precipitating with an organoaluminum compound, and treating with titanium tetrachloride. Catalyst A contained about 10 weight percent prepolymer. Catalyst B was a commercial catalyst containing prepolymer. Catalyst C was a catalyst which had been treated with diethylaluminum chloride after the titanium tetrachloride treatment, Catalyst C contained about 40 weight percent prepolymer. Catalyst D also contained prepolymer.

In each case, a slurry of the catalyst was well shaken and mixed with varying amounts of the refractory oxide and when employed, antistatic agent in a liquid diluent. The antistatic agent Stadis 450 was obtained from DuPont. From the solid weight percent of the original catalyst slurry, determination of the weight percentage of refractory oxide based on a total solid weight was possible. The polymerizations were carried out at 90° C. in a 3.8 liter autoclave reactor. The reactor was prepared for polymerization by heating to 110° C. for one hour. The reactor was then cooled to room temperature where it was flushed with nitrogen free isobutane. After the reactor had cooled, 0.5 ml of 15 weight percent triethylaluminum in heptane was charged followed by the addition of the respective catalyst slurry. The reactor was sealed and 25 psig of hydrogen was added as measured by a pressure drop in a 2.25 liter vessel. Next, 2 liters of isobutane was added at room temperature using a nitrogen purge and being careful not to get nitrogen into the reactor. The reactor was heated to polymerization temperature and 90 g of 1-hexene was pressured in from a side port. Then ethylene was constantly added to keep the total pressure of the reactor at 324 psig. After one hour, the polymerization was terminated by stopping the flow of ethylene, and the reactor was vented, the polymer was collected, dried overnight and weighed and evaluated for various properties.

The melt index (MI) and high load melt index (HLMI) were measured using ASTM-1238 conditions of 190/2.16 and 190/21.6 respectively. Bulk densities of the polymer were measured by weighing a 100 ml graduated cylinder in which the polymer fluff had been lightly tapped. Polymer densities were determined according to ASTM-D-1505 using compression molded discs of polymer. Corrected polymer densities were obtained by normalizing the polymer densities for a MI value of one. Titanium and chloride content of the polymer and the solution above the catalyst were determined by X-ray fluorescence. The results of the various polymerizations are summarized in Table 2.

TABLE 2

Polymerization Results from Different Additives

| Run Number | Catalyst | Catalyst Weight | Additive | Weight (g) | Stadis 450 (ml) | MI | HLMI | SR | Bulk Density (lb/ft3) | Density (g/cc) | Density MI = 1 (g/cc) |
| --- | --- | --- | --- | --- | --- | --- | --- | --- | --- | --- | --- |
| 1 | D | 40 g | — | — | 0 | 0.82 | 27.2 | 33.2 | 17.5 | no C6= | |
| 2 | D | 40 g | — | — | 0 | 2.59 | 77.30 | 29.8 | 13.7 | 0.9346 | 0.9327 |
| 3 | D | 40 g | — | — | 5.0 | 0.74 | 24.5 | 33.1 | 17.6 | no C6= | |
| 4 | D | 40 g | — | — | 5.0 | 1.3 | 39.7 | 30.5 | 13.3 | 0.9364 | 0.9359 |
| 5 | D | 40 g | M-5 | 10.8 | 0 | 1.65 | 46.8 | 28.4 | 14.8 | 0.9406 | 0.9396 |
| 6 | B | 100% | 0 | — | 0 | 2.49 | 77.8 | 31.2 | 17.4 | 0.9432 | 0.9414 |
| 7 | B | 20 g | 0 | — | 7.5 | 1.93 | 59.4 | 30.8 | 16.4 | 0.9421 | 0.9408 |
| 8 | B | 20 g | HS-5 | 2.5 | 5.0 | 3.16 | 93.9 | 29.7 | 16.3 | 0.9418 | 0.9395 |
| 9 | B | 20 g | HS-5 | 1.0 | 25.0 | 1.43 | 44.7 | 31.3 | 15.3 | 0.9416 | 0.9409 |
| 10 | B | 40 g | HS-5 | 5.0 | 42.5 | 1.89 | 60.4 | 32 | 16.3 | 0.9414 | 0.9401 |
| 11 | B | 20 g | HS-5 | 5.0 | 10.0 | 2.44 | 74.7 | 30.6 | 16.7 | 0.9418 | 0.9400 |
| 12 | B | 20 g | TS-720 | 1.0 | 25.0 | 2.84 | 87.9 | 31 | 16 | 0.945 | 0.9429 |
| 13 | B | 20 g | TS-720 | 1.0 | 25.0 | 1.78 | 54.3 | 30.5 | 16.3 | 0.9433 | 0.9422 |

TABLE 2-continued

Polymerization Results from Different Additives

| Run Number | Catalyst | Catalyst Weight | Additive | Weight (g) | Stadis 450 (ml) | MI | HLMI | SR | Bulk Density (lb/ft3) | Density (g/cc) | Density MI = 1 (g/cc) |
|---|---|---|---|---|---|---|---|---|---|---|---|
| 14 | C | 40 g | TS-720 | 2.0 | 40.0 | 1.55 | 35.8 | 23.1 | 17.4 | 0.9406 | 0.9397 |
| 15 | B | 20 g | PTG | 1.0 | 25.0 | 3.14 | 94.7 | 30.2 | 15.6 | 0.9401 | 0.9378 |
| 16 | B | 20 g | Fumed Alumina | 1.0 | 25.0 | 1.92 | 60.3 | 31.4 | 16.2 | 0.9411 | 0.9398 |
| 17 | B | 20 g | Fumed TiO$_2$ | 1.0 | 25.0 | 2.92 | 89.7 | 30.1 | 16.1 | 0.9407 | 0.9386 |

For catalyst D and B, runs 2 and 6, respectively represent control polymerizations using comonomer and no refractory oxide. It will be noted that runs 1 and 3 were polymerizations which did not employ the introduction of hexene comonomer.

A comparison of runs 2 and 5 shows that the fumed silica M-5 caused no significant change in the titanium and chloride levels. Similarly, the comparison of runs 6 with runs 8-11 shows that the fumed silica HS-5 did not result in any significant change in the titanium or chloride levels.

The data also shows that the addition of the fumed oxides and/or the antistatic agent did not have an adverse effect on either comonomer incorporation, catalyst activity, or polymer bulk density. This is in contrast to observations that have been made in the past when the polymerizations were conducted in the presence of the larger particle size high surface area silica such as Davidson Grade 952 silica gel. Other work with titanium catalysts has demonstrated that even when Cab-O-Sil HS-5 fumed silica is used at a silica to catalyst weight ratio of 0.175/1, the polymer properties were essentially equivalent, within the scope of experimental error, to those obtained using the catalyst without the fumed silica.

EXAMPLE III

In order to better determine the extent to which Cab-O-Sil ® HS-5 fumed silica improved catalyst flow, a method was devised to measure flow rates. A dropping funnel with a 0.2 cm diameter hole in its stopcock was placed in a dry box and the slurry of solids to be studied was well shaken and poured into it. To account for differences in dilution of the catalyst when mixed with the fumed silica, the catalyst was allowed to settle for one hour. After this time the solids volume of the mixture no longer changed, and the level was recorded. The stopcock was then opened and the solid began to flow. The length of time the solid flowed before plugging, as well as the change in solids volume, was recorded and converted into a rate. The average flow rate for the catalyst slurry with and without the antistatic agent are presented in Table 3. In the table the weight percent refers to weight percent of refractory oxide based on the weight of the catalyst plus the weight of the refractory oxide.

TABLE III

Average Flow Rates for the Catalyst A and Cab-O-Sil HS-5 With and Without Stadis 450

| Stadis 450 Present | | Stadis 450 Absent | |
|---|---|---|---|
| Weight Percent HS-5 | Rate (ml/min) | Weight Percent HS-5 | Rate (ml/min) |
| 0.0 | 1.4 | 0.0 | 3.0 |
| 7.7 | 11.4 | 2.4 | 3.0 |
| 14.9 | 23.0 | 7.7 | 11.2 |
| 14.9 | 21.0 | 7.7 | 10.9 |
| | | 14.9 | 21.2 |
| | | 100.0 | 160.0 |
| | | 100.0 | 156.0 |

It appears that within experimental error, the antistatic agent had little effect on the flow rate of the mixture; however, it was considered to be important in that without it, the catalyst slurry had a slight tendency to be more likely to plug the funnel more frequently. The runs made using only a slurry of HS-5 without either Stadis 450 or catalyst flowed best, but of course, would not have commercial value as a polymerization catalyst.

EXAMPLE IV

Using the same technique as described in Example III, the effect of three other silicas on the flow rate of the catalyst slurry were evaluated. The three silicas evaluated were larger primary particle size silicas, namely Sylox ® 2, Syloid ® 63, and Syloid ® 244. Those silicas had average primary particle sizes of 2 to 3 microns, 9 microns, and 3 microns respectively. At equal weight percents silica the Sylox ® 2 provided a better flow rate than the Syloid ® 244 or Syloid ® 63; however, that flow rate was not nearly as good as the flow rate obtained with the same weight percent of Cab-O-Sil HS-5. Similarly, in terms of equal volume percent of silica, the Cab-O-Sil HS-5 provided a superior flow rate to the larger primary particle size silicas.

EXAMPLE V

One of the particulate chromium-containing catalysts that has been used in the past is prepared by treating a porous silica such as Davidson 952 grade silica with chromium. In order to evaluate the effect of small particle size refractory oxide on the flow of such a catalyst in a liquid slurry, a number of runs were carried out using a procedure like that described in Example III.

First, a series of tests were done using liquid slurries of Davidson 952 grade silica which had been activated by heating at 760° C. Five tests were conducted. Each test used liquid slurries containing the same weight percent solids. The average flow rate was 15 ml/minute. Then standard deviation was 4 ml/minute.

Then another series of tests were carried out using slurries containing 40.25 grams of the activated 952 grade silica and 4.5 grams of Cab-O-Sil HS-5 fumed silica. Four tests were conducted. The average flow rate was 85.4 ml/min. and the standard deviation was 15.6 ml/min. This shows that the fumed silica provided a significant improvement in the flow of the larger particle size 952 grade silica.

EXAMPLE VI

Another series of tests was conducted to determine whether small aggregate size refractory oxide could improve the flow of a commercial chromium-containing tergel olefin polymerization catalyst. This particulate catalyst contains Cr, Ti, and Si. The tests were conducted using the tergel catalyst which had been activated at 760° C.

First, a series of tests were carried out using slurries containing only the tergel. In some runs the catalyst flowed out in a stream at a relatively fast rate and in some other runs the catalyst flowed in a more dropwise fashion, i.e. a slower flow rate. It is unclear why these differences in flow occurred. For all the tests the average flow rate was 33 ml/min. with a standard deviation of 16 ml/min.

Another series of tests were conducted using a slurry containing 3.27 grams of Cab-O-Sil HS-5 and 29.47 grams of the tergel. In one run, for some reason, the orifice in the stopcock appeared to be plugging. The results of that run was ignored. For the five other runs the average flow rate was 41 ml/min. and the standard deviation was 11 ml/min. Using the statistical t-test it follows that there is a 97.5% certainty that the flow rate obtained using the fumed silica was better than the flow rate when the fumed silica was not employed.

That which is claimed is:

1. A process for polymerizing olefins comprising charging a liquid slurry of particulate olefin polymerization catalyst through a restrictive opening into a polymerization zone wherein said catalyst is contacted with at least one olefin under suitable polymerization conditions, wherein said slurry of olefin polymerization catalyst has been prepared by combining the particulate olefin polymerization catalyst and a refractory oxide powder in a suitable liquid, said refractory oxide powder being selected from fumed silica, fumed titanium dioxide, and fumed alumina and being added to the slurry in an amount sufficient to improve the flow of said catalyst through the restrictive opening.

2. A process according to claim 1 wherein the refractory oxide powder comprises aggregates of primary particles and substantially all of said aggregates have a particle size of less than about 3 microns.

3. A process according to claim 2 wherein said refractory oxide powder has an average primary particle size in the range of about 0.001 micron to about 0.1 micron.

4. A process according to claim 2 wherein said refractory oxide powder has an average primary particle size in the range of about 0.001 micron to about 0.03 micron.

5. A process according to claim 4 wherein said refractory oxide powder consists essentially of fumed silica.

6. A process according to claim 5 wherein weight ratio of the refractory oxide powder to the solid catalyst is in the range of about 0.01/1 to about 0.5/1.

7. A process according to claim 5 wherein the weight ratio of the refractory oxide powder to the solid catalyst is in the range of about 0.025/1 to about 0.35/1.

8. A process according to claim 7 wherein said refractory oxide powder is fumed silica wherein substantially all of the primary particles have a diameter in the range of about 0.005 to about 0.02 micron.

9. A process according to claim 8 wherein said fumed silica has an average primary particle size in the range of about 0.005 to about 0.02 micron.

10. A process according to claim 9 wherein said fumed silica is a hydrophilic silica having an average primary particle size in the range of about 0.005 to about 0.015 micron.

11. A process according to claim 10 wherein the weight ratio of the refractory oxide powder to the solid catalyst is in the range of about 0.05/1 to about 0.30/1.

12. A process according to claim 11 wherein said catalyst is a particulate titanium-containing solid containing about 1 to about 50 weight percent prepolymer.

13. A process according to claim 12 wherein said catalyst has been prepared by steps involving contacting magnesium dichloride and a titanium alkoxide in a liquid to obtain a solution, contacting the solution with an alkylaluminum halide to obtain a solid, contacting said solid with an olefin to obtain a prepolymerized solid, and contacting the prepolymerized solid with titanium tetrachloride.

14. A process according to claim 13 wherein ethylene is polymerized along with at least one other olefin comonomer.

15. A process according to claim 14 wherein said olefin comonomer is selected from the group consisting of propylene, butene, hexene, octene, and 4-methyl-1-pentene.

16. A process according to claim 15 wherein ethylene is the major olefin that is polymerized.

17. A process according to claim 13 wherein said slurry includes a suitable antistatic agent.

18. A process according to claim 17 wherein said antistatic agent contains sulfone and amide groups.

19. A process according to claim 18 wherein the catalyst is one which has been prepared by a process involving the additional step of contacting the titanium tetrachloride treated solid with a trialkylaluminum compound before the catalyst is introduced into the slurry.

20. A process according to claim 7 wherein said particulate olefin polymerization catalyst comprises chromium.

21. A process according to claim 1 wherein said polymerization is conducted under particle form conditions in a loop reactor.

22. A process according to claim 21 wherein the refractory oxide powder consists essentially of fumed silica having a primary particle size in the range of about 0.005 to about 0.02 microns and wherein the weight ratio of the refractory oxide to the catalyst is in the range of about 0.1/1 to 0.25/1.

* * * * *